(12) United States Patent
Zhang

(10) Patent No.: US 7,662,510 B2
(45) Date of Patent: Feb. 16, 2010

(54) X-RAY SENSITIVE BATTERY SEPARATOR AND A METHOD FOR DETECTING THE POSITION OF A SEPARATOR IN A BATTERY

(75) Inventor: Zhengming Zhang, Charlotte, NC (US)

(73) Assignee: Celgard LLC, Charlotte, NC (US)

( * ) Notice: Subject to any disclaimer, the term of this patent is extended or adjusted under 35 U.S.C. 154(b) by 307 days.

(21) Appl. No.: 11/858,364

(22) Filed: Sep. 20, 2007

(65) Prior Publication Data

US 2009/0081535 A1    Mar. 26, 2009

(51) Int. Cl.
*H01M 2/14* (2006.01)
*G01B 15/00* (2006.01)
*H01M 2/02* (2006.01)

(52) U.S. Cl. .................. 429/164; 429/122; 73/865.8
(58) Field of Classification Search .............. 429/164
See application file for complete search history.

(56) References Cited

U.S. PATENT DOCUMENTS 3,861,963 A * 1/1975 Afrance et al. .............. 429/251

| | | |
|---|---|---|
| 5,154,988 A | 10/1992 | Choi et al. |
| 5,336,573 A | 8/1994 | Zuckerbrod et al. |
| 5,654,115 A | 8/1997 | Hasebe et al. |
| 6,348,286 B1 | 2/2002 | Tanaka et al. |
| 6,420,070 B1 | 7/2002 | Kasamatsu et al. |
| 6,423,445 B1 | 7/2002 | Kato et al. |
| 6,432,586 B1 | 8/2002 | Zhang |
| 6,713,217 B2 | 3/2004 | Oura et al. |
| 7,147,958 B2 * | 12/2006 | Prakash et al. .............. 429/42 |
| 2002/0166802 A1 * | 11/2002 | Jung et al. .................. 209/575 |

* cited by examiner

*Primary Examiner*—Patrick Ryan
*Assistant Examiner*—Brent Thomas
(74) *Attorney, Agent, or Firm*—Hammer & Associates, P.C.

(57) ABSTRACT

The instant application relates to an X-ray sensitive battery separator for a secondary lithium battery and a method for detecting the position of a separator in a secondary lithium battery. The X-ray sensitive battery separator includes a microporous membrane having an X-ray detectable element. The X-ray detectable element constitutes less than 0.1% by weight of the microporous membrane. The method for detecting the position of a separator in a battery includes the following steps: (1) providing a battery including an X-ray sensitive battery separator; (2) subjecting the battery to X-ray radiation; and (3) thereby detecting the position of said separator in said battery.

9 Claims, 1 Drawing Sheet

X-RAY SENSITIVE BATTERY SEPARATOR AND A METHOD FOR DETECTING THE POSITION OF A SEPARATOR IN A BATTERY

FIELD OF INVENTION

The instant application relates to an X-ray sensitive battery separator and a method for detecting the position of a separator in a battery.

BACKGROUND OF THE INVENTION

A battery separator is used to separate the positive and negative electrodes of a battery, for example, a secondary lithium battery. A battery separator is typically microporous to allow ionic current with least possible resistance.

In general, a battery separator is sandwiched between the positive electrode and the negative electrode of a secondary lithium battery. It is important for a battery separator to remain in its proper position because even a minute displacement may cause a short in the battery. Currently there are no prevailing techniques to determine the position of a separator in a battery to prevent the introduction of flawed batteries, i.e. those batteries in which the battery separator was displaced during the manufacturing process, into the consumer market.

U.S. Pat. No. 3,861,963 discloses a porous separator, which is coated or impregnated with an inorganic material. The inorganic coating may be an insoluble metal oxide and insoluble hydrous metal oxides such as the oxides and hydrous oxides of Zr, Ti, Sb, W, Si, Sc, Bi, V, Al, and Ce. The coating, however, constitutes about 15-32 percent by weight of the separator.

U.S. Pat. No. 5,154,988 discloses a battery separator comprising of three layers, which include a base web, a glass mat, and a natural rubber. The base web includes a filler such as silica and small amounts of alum and other retention aids such as cationic or anionic copolymers, including cationically or anionically modified high molecular weight polyacrylamide.

U.S. Pat. No. 5,336,573 discloses a separator comprising a microporous membrane sheet composed of substantially uniform mixture of a polymer and a filler present in a weight ratio of about 1:2.5 to about 1:30 which has a fibrous sheet encapsulated therein.

U.S. Pat. No. 5,654,115 discloses a hydrogen-absorbing alloy for a battery capable of satisfying leading characteristics of high electrode capacity, and long life. An X-ray microanalyzer is employed to determine the weight percent of the hydrogen-absorbing particles.

U.S. Pat. No. 6,348,286 discloses an alkaline battery separator comprising a fiber sheet containing, on the outer surface of fiber sheet, a substance having a peak of bond energy at 503.5 to 5.31.5 eV. The peak of the bond energy is measured via an X-ray photoelectron spectrometer.

U.S. Pat. No. 6,420,070 discloses an electrode made of a graphite material capable of intercalating and de-intercalating lithium ions. CuK α as the X-ray source is utilized to determine the wide angle X-ray diffraction of the electrode.

U.S. Pat. No. 6,423,445 discloses a battery separator comprising a gas-permeable sheet that contains a hydrophilic portion carrying a methacrylic/ethylene copolymer component having a crystalinity of 25% or more on at least a part of surface of the hydrophobic portion. Fluorescent X-ray method is utilized to measure X-ray intensity thereby determining the amount of sulfur atoms per unit of area.

U.S. Pat. No. 6,432,586 discloses a separator for a high-energy rechargeable lithium battery. The separator comprises a ceramic composite layer and a polymeric microporous layer. The ceramic composite layer comprises a matrix material having inorganic particles dispersed therethrough. The inorganic particles may be selected from $SiO_2$, $Al_2O_3$, $CaCO_3$, $TiO_2$, $SiS_2$, $SiPO_4$, and the like, or mixtures thereof. The inorganic particles form approximately 20-95% by weight of the ceramic composite layer.

U.S. Pat. No. 6,713,217 discloses a hybrid separator.

Despite the research efforts in developing battery separators, there is a still a need for a battery separator, which is readily detectable when embedded in a battery to determine its position within the battery, and it is relatively easy to manufacture at a low cost. Furthermore, there is still a need for a method for detecting the position of a separator in a battery, which is relatively easy and cost effective.

SUMMARY OF THE INVENTION

The instant application relates to an X-ray sensitive battery separator for a secondary lithium battery and a method for detecting the position of a separator in a secondary lithium battery. The X-ray sensitive battery separator includes a microporous membrane having an X-ray detectable element. The X-ray detectable element constitutes less than 0.1% by weight of the microporous membrane. The method for detecting the position of a separator in a battery includes the following steps: (1) providing a battery including an X-ray sensitive battery separator; (2) subjecting the battery to X-ray radiation; and (3) thereby detecting the position of said separator in said battery.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
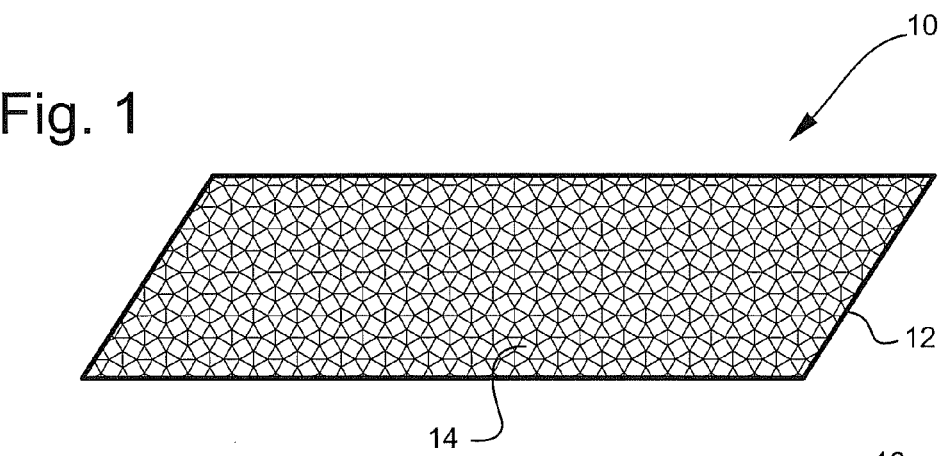
FIG. 1 is a first embodiment of an X-ray sensitive battery separator according to the instant invention.

Referring to the drawings wherein like numerals indicate like elements, there is shown, in FIG. 1, a first embodiment of an X-ray sensitive battery separator 10. The X-ray sensitive battery separator 10 includes a microporous membrane 12, which contains an X-ray detectable element 14 dispersed therethrough.

Microporous membrane 12 may be any conventional microporous membrane. Microporous membranes are generally known in the art. Microporous membrane 12 may be made from any material, for example a polymer. A polymer, for example, may be any synthetic polymer, cellulose, or synthetically modified cellulose. The preferred synthetic polymers are polyolefins, e.g., polyethylene, polyproplyene, polymethylpentene, polybutylene, ultra high molecular weight polyethylene, copolymers thereof, and mixtures thereof. Microporous membrane 12 may have any porosity; for example, microporous membrane 12 may have a porosity in the range of about 20% to about 80%. Microporous membrane 12 may have any average pore size; for example, microporous membrane 12 may have an average pore size in the range of about 0.1 micron to about 5 microns. Microporous membrane 12 may have any thickness; for example, microporous membrane 12 may have a thickness in the range of about 10 microns to about 75 microns.

X-ray detectable element 14 may be any X-ray detectable material. For example, X-ray material may be a material selected from the group consisting of a metal oxide, a metal phosphate, a metal carbonate, an X-ray fluorescent material, and combinations thereof. The listed X-ray materials are not limiting. Exemplary metal oxides include, but are not limited to, metal oxides having a metal selected from the group consisting of Zn, Ti, Mn, Ba, Ni, W, Hg, Si, Cs, Sr, Ca, Rb, Ta, Zr, Al, Pb, Sn, Sb, Cu, Ni, and Fe. The listed metal oxides are not limiting. Exemplary metal phosphates include, but are not limited to, phosphate oxides having a metal selected from the group consisting of Zn, Ti, Mn, Ba, Ni, W, Hg, Si, Cs, Sr, Ca, Rb, Ta, Zr, Al, Pb, Sn, Sb, Cu, Ni, and Fe. The listed metal phosphates are not limiting. Exemplary metal carbonates include, but are not limited to, metal carbonates having a metal selected from the group consisting of Zn, Ti, Mn, Ba, Ni, W, Hg, Si, Cs, Sr, Ca, Rb, Ta, Zr, Al, Pb, Sn, Sb, Cu, Ni, and Fe. The listed metal carbonates are not limiting. Exemplary X-ray fluorescent materials include, but are not limited to, organic materials, inorganic materials, and combinations thereof. A fluorescent material, as used herein, refers to a material having electrons capable of becoming exited by X-ray radiation thereby providing detection signals. The listed X-ray fluorescent materials are not limiting. X-ray detectable element 14 may constitute any percentage of the weight of membrane 12. For example, the X-ray detectable element may constitute in the range of 0.01 to 0.1 percent by weight of the membrane 12.

Figure 2:
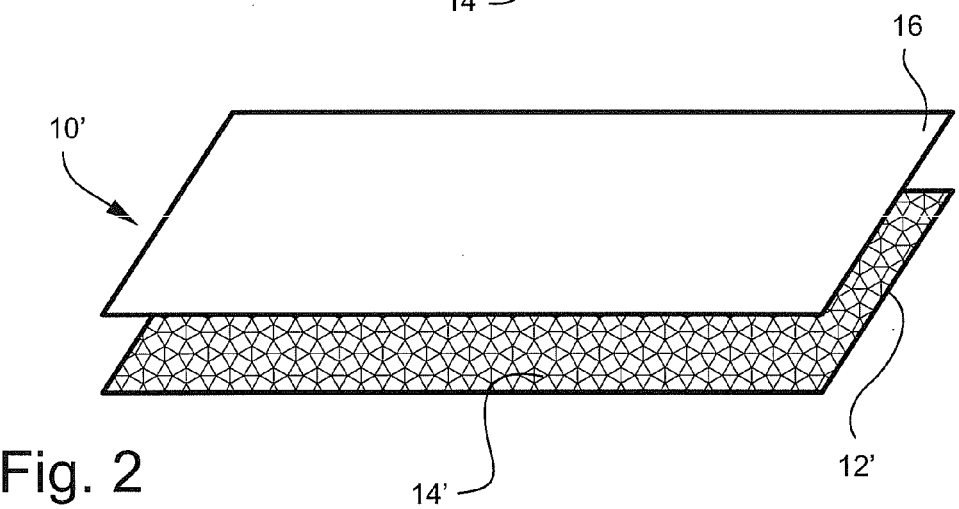
FIG. 2 is a second embodiment of an X-ray sensitive battery separator according to the instant invention.

In the alternative, referring to FIG. 2, the X-ray sensitive battery separator 10' may be a multi-layer battery separator. Multi-layer, as used herein, refers to two or more layers. The X-ray battery separator 10' preferably includes a microporous membrane 12', which contains an X-ray detectable element 14', and at least one other layer 16. Preferably, the X-ray battery separator 10' includes a plurality of layers 16. Additionally, at least one layer may be a shutdown layer, i.e., one adapted to shut down ionic flow between the electrodes in the event of thermal runaway or internal short circuiting caused by internal or external circumstances.

Microporous membrane 12' may be any conventional microporous membrane. Microporous membranes are generally known in the art. Microporous membrane 12' may be made from any material, for example a polymer. A polymer, for example, may be any synthetic polymer, cellulose, or synthetically modified cellulose. The preferred synthetic polymers are polyolefins, e.g., polyethylene, polyproplyene, polymethylpentene, polybutylene, ultra high molecular weight polyethylene, copolymers thereof, and mixtures thereof. Microporous membrane 12' may have any porosity; for example, microporous membrane 12' may have a porosity in the range of about 20% to about 80%. Microporous membrane 12' may have any average pore size; for example, microporous membrane 12' may have an average pore size in the range of about 0.1 micron to about 5 microns. Microporous membrane 12' may have any thickness; for example, microporous membrane 12' may have a thickness in the range of about 10 microns to about 75 microns.

X-ray detectable element 14' may be any X-ray detectable material. For example X-ray material 14' may be a material selected from the group consisting of a metal oxide, a metal phosphate, a metal carbonate, and an X-ray fluorescent material. The listed X-ray materials are not limiting. Exemplary metal oxides include, but are not limited to, metal oxides having a metal selected from the group consisting of Zn, Ti, Mn, Ba, Ni, W, Hg, Si, Cs, Sr, Ta, Al, Pb, Sn, Sb, Cu, Ni, and Fe. The listed metal oxides are not limiting. Exemplary metal phosphates include, but are not limited to, phosphate oxides having a metal selected from the group consisting of Zn, Ti, Mn, Ba, Ni, W, Hg, Si, Cs, Sr, Ca, Rb, Ta, Zr, Al, Pb, Sn, Sb, Cu, Ni, and Fe. The listed metal phosphates are not limiting. Exemplary metal carbonates include, but are not limited to, metal carbonates having a metal selected from the group consisting of Zn, Ti, Mn, Ba, Ni, W, Hg, Si, Cs, Sr, Ca, Rb, Ta, Zr, Al, Pb, Sn, Sb, Cu, Ni, and Fe. The listed metal carbonates are not limiting. Exemplary X-ray fluorescent materials include, but are not limited to, organic materials, inorganic materials, and combinations thereof. A fluorescent material as used herein refers to a material having electrons capable of becoming exited by X-ray radiation thereby providing detection signals. The listed X-ray fluorescent materials are not limiting. X-ray detectable element 14' may constitute any percentage of the weight of membrane 12'. For example, the X-ray detectable element may constitute in the range of 0.01 to 0.1 percent by weight of the membrane 12'.

Layer 16 may be any conventional microporous membrane. Microporous membranes are generally known in the art. Layer 16 may be made from any material, for example a polymer. A polymer, for example, may be any synthetic polymer, cellulose, or synthetically modified cellulose. The preferred synthetic polymers are polyolefins, e.g., polyethylene, polyproplyene, polymethylpentene, polybutylene, ultra high molecular weight polyethylene, copolymers thereof, and mixtures thereof. Layer 16 may have any porosity; for example, layer 16 may have a porosity in the range of about 20% to about 80%. Layer 16 may have any average pore size; for example, layer 16 may have an average pore size in the range of about 0.1 micron to about 5 microns. Layer 16 may have any thickness; for example, layer 16 may have a thickness in the range of about 10 microns to about 40 microns.

Figure 3:
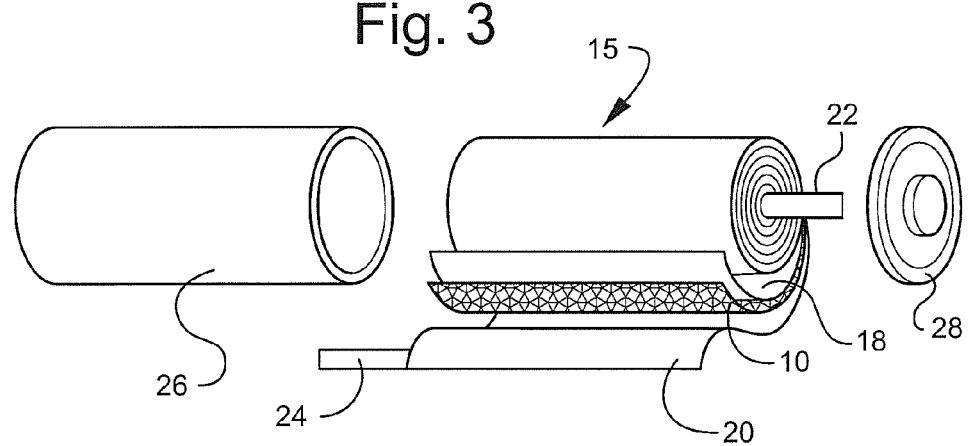
FIG. 3 is an exploded view of a battery including the X-ray sensitive battery separator of FIG. 1.

In manufacturing, referring to FIG. 3, the X-ray sensitive battery separator 10, is sandwiched between a positive electrode 18 and a negative electrode 20, and may be subsequently rolled into a jellyroll 15 (prismatic constructions are also possible). The jellyroll 15 may further include negative tab 24, and positive tab 22. Positive electrode 18 may include a metal sheet, e.g., aluminum foil, i.e. the current collector, upon which the positive electrode material or electrode active mix (not shown but conventional) has been spread in conventional manner. Negative electrode 20 may include a metal sheet, e.g., copper foil, i.e. the current collector, upon which the negative electrode material or electrode active mix (not shown but conventional) has been spread in conventional manner. Subsequently, jellyroll 15 is inserted into can 26, which is filled with an electrolyte (not shown), and then, can 26 is sealed with cap 28. can 26 may be a metallic (e.g., steel, stainless steel, aluminum) cylindrical can, a plastic box, of a foil (e.g., metallized foil) pouch. Electrolyte may be any substance capable of providing ionic conductivity. Electrolyte may, for example, be a liquid electrolyte, a solid electrolyte, or a gel electrolyte. A liquid electrolyte generally includes an electrolytic salt dissolved in a solvent, i.e. an inorganic solvent or an organic solvent. A gel electrolyte generally includes an electrolytic salt dissolved in non-aqueous solvent, and gelated with a polymer matrix.

In operation, a battery containing an X-ray sensitive battery separator 10 is subjected to X-ray radiation thereby facilitating the detection of the position of the X-ray sensitive battery separator 10 within the battery. For example, the separator is usually wider than the electrodes, so that the separator extends beyond the lateral edges of the electrodes. The separator extends beyond the lateral edges of the electrodes to prevent the electrodes from coming into physical contact and thereby creating the potential for short-circuiting. It is possible that during winding or in the battery assembly that the separator portion that extends beyond the lateral edges of the electrodes is removed or pushed back or otherwise misplaced thereby allowing the possibility of physical contact of the electrodes. An X-ray examination of the assembled battery allows a check to determine that the separator remains in position throughout manufacture. The X-ray visible separator can be observed, via X-ray examination, to ensure that it has maintained its position (i.e., a portion extending beyond the lateral edges of the electrodes). Further, it is possible that the inspection process could be automated, via computer, to increase the speed of inspection.

The present invention may be embodied in other forms without departing from the spirit and the essential attributes thereof, and, accordingly, reference should be made to the appended claims, rather than to the foregoing specification, as indicated the scope of the invention.

I claim:

1. A method for detecting the position of a separator relative to electrodes in a secondary lithium battery comprising the steps of:
    providing a secondary lithium battery including a positive electrode, a negative electrode, a X-ray sensitive separator located between the electrodes, and a can housing the electrodes and separator, the X-ray sensitive separator comprising a microporous membrane having a X-ray detectable element dispersed therein, the X-ray detectable element comprising 0.01-0.1 weight % of the membrane;
    subjecting the secondary lithium battery to X-ray radiation;
    determining the position of the separator relative to the electrodes; and
    approving or rejecting the secondary lithium battery based upon the position of the separator relative to the electrodes.

2. The method of claim 1 wherein the X-ray detectable element being selected from the group consisting of metal, metal oxide, metal phosphate, metal carbonate, X-ray fluorescent material, or mixtures thereof, and any of the foregoing metals being selected from the group consisting of Zn, Ti, Mn, Ba, Ni, W, Hg, Si, Cs, Sr, Ca, Rb, Ta, Zr, Al, Pb, Sn, Sb, Cu, Fe, and mixtures thereof.

3. The method of claim 2 wherein any of the foregoing metals being selected from the group consisting of Zn, Ti, Mn, Ba, Ni, and mixtures thereof.

4. A X-ray sensitive battery separator for a secondary lithium battery comprising:
    a microporous membrane having a X-ray detectable element dispersed therein, said X-ray detectable element comprising between 0.01-0.1 weight % of the membrane.

5. The X-ray sensitive battery separator of claim 4 wherein the X-ray detectable element being selected from the group consisting of metal, metal oxide, metal phosphate, metal carbonate, X-ray fluorescent material, or mixtures thereof, and any of the foregoing metals being selected from the group consisting of Zn, Ti, Mn, Ba, Ni, W, Hg, Si, Cs, Sr, Ca, Rb, Ta, Zr, Al, Pb, Sn, Sb, Cu, Fe, and mixtures thereof.

6. The X-ray sensitive battery separator of claim 5 wherein any of the foregoing metals being selected from the group consisting of Zn, Ti, Mn, Ba, Ni, and mixtures thereof.

7. A secondary lithium battery for X-ray inspection comprising:
    a positive electrode, a negative electrode, a X-ray sensitive separator located between the electrodes, and a can housing the electrodes and separator, the X-ray sensitive separator comprising a microporous membrane having a X-ray detectable element dispersed therein, the X-ray detectable element comprising between 0.01-0.1 weight % of the membrane.

8. The secondary lithium battery of claim 7 wherein the X-ray detectable element being selected from the group consisting of metal, metal oxide, metal phosphate, metal carbonate, X-ray fluorescent material, or mixtures thereof, and any of the foregoing metals being selected from the group consisting of Zn, Ti, Mn, Ba, Ni, W, Hg, Si, Cs, Sr, Ca, Rb, Ta, Zr, Al, Pb, Sn, Sb, Cu, Fe, and mixtures thereof.

9. The secondary lithium battery of claim 8 wherein any of the foregoing metals being selected from the group consisting of Zn, Ti, Mn, Ba, Ni, and mixtures thereof.

* * * * *